Dec. 6, 1966 W. R. SMITH 3,290,663

NON-DESTRUCTIVE READ-OUT CIRCUIT

Filed Oct. 10, 1962

INVENTOR.
W.R. SMITH

BY Forest B. Hitchcock

HIS ATTORNEY

United States Patent Office 3,290,663

Patented Dec. 6, 1966

3,290,663

NON-DESTRUCTIVE READ-OUT CIRCUIT

Willis R. Smith, Rochester, N.Y., assignor to General Signal Corporation, a corporation of New York Filed Oct. 10, 1962, Ser. No. 229,572
9 Claims. (Cl. 340—174)

This invention relates to magnetic memory systems and more particularly to magnetic systems utilizing ferrite cores for storage of binary information for an indefinite duration.

In information storage systems it is often desirable to retain information for an indefinite duration, without any limitation upon the number of times the information may be read out. Heretofore, such storage has been achieved by recording the information upon various forms of recording media, such as, for example, magnetic tape. However, such media are incapable of simultaneously acting as a circuit element, other than by actuating transducer means which in turn may provide an input signal for a circuit.

Ferrite cores are among those means commonly utilized for storage of information. These cores are also capable of acting as switching elements in a circuit. In particular, multi-aperture cores have been proven to be highly useful circuit elements, especially in switching circuits requiring temporary retention of information. In the past, however, circuit designers have been handicapped in utilizing multi-aperture cores for many circuit applications, due to the limited capability of multi-aperture cores to retain information indefinitely regardless of the number of times the information is read out. Thus, multi-aperture cores have not been used in applications requiring non-destructive read-out for indefinite durations. Present-day multi-aperture cores may be read out continuously and non-destructively to provide approximately one hundred output pulses, after which the amplitude of output pulses becomes insufficient to set another core. This invention makes it possible to read-out indefinitely the information stored in a multi-aperture core by utilizing a feed back winding to reset the core each time an output pulse is produced.

The invention contemplates use of a first multi-aperture core having a source of drive pulses wound through an output minor aperture. Means are provided upon the first core for setting the core through an input minor aperture and for clearing the core through its major aperture. An output winding is wound through the output minor aperture of the first core and connected so as to set a second multi-aperture core through a minor aperture and to simultaneously set the first core through its input minor aperture. Thus, each time an output pulse is produced on the output winding of the first core, the first core receives a set pulse simultaneously with the second core.

Therefore, one object of the invention is to provide means for resetting a magnetic core each time the core is read out.

Another object is to provide means for non-destructively reading out a magnetic core for an indefinite duration.

Another object is to provide a feedback circuit for a multi-aperture core.

Another object is to provide a method and apparatus for magnetic storage of binary information for an indefinite duration, without limitation upon the number of times the information may be read out.

These and other objects and advantages of the invention will become apparent from the following detailed description when read in conjunction with the accompanying drawings, in which.

Figure 1:
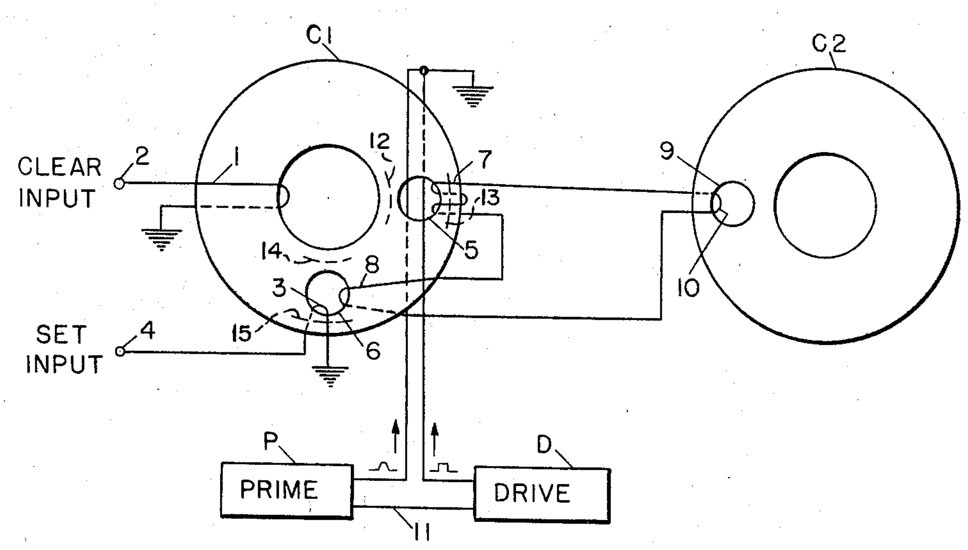
FIG. 1 is a schematic diagram of the invention showing use of a feedback winding to reset the driving core.

Referring now to FIG. 1, the circuit is shown comprising a driving core C1 and a single driven core C2. Although but a single driven core is shown, it will readily be understood by those skilled in the art that the number of driven cores is limited only by the amplitude of output current which can be produced from driving core C1. A source of prime pulses P and a source of drive pulses D are shown coupled through an output minor aperture 5 of core C1.

Prime generator P and drive generator D are synchronized through a sync lead 11, so as to produce pulses at identical frequencies and different phases. It should be noted, however, that the prime generator may produce steady direct current, rather than unidirectional current pulses, without thereby altering the mode of operation. Alternatively, prime generator P and drive generator D may be replaced by a single generator such as a square wave generator producing pulses of alternating polarity over a single winding threading minor aperture 5, again without altering the mode of operation. Although the output of one polarity would thereby have to be somewhat altered with respect to the other polarity in order to avoid production of unwanted output pulses during the priming operation, means to accomplish such alteration are well-known in the art.

A clear winding 1 having an input terminal 2 is wound through the major aperture of core C1, while a set winding 3 having an input terminal 4 is wound through minor aperture 6 of core C1. An output winding 7 wound through minor aperture 5 of core C1 couples output current pulses from core C1 through a minor aperture 9 of core C2 and an input minor aperture 6 of core C1, in series. The output pulses from core C1 thread minor aperture 9 of core C2 through set winding 10, and thread minor aperture 6 of core C1 through feedback winding 8. The inner and outer flux paths enclosing minor aperture 5 are designated 12 and 13 respectively, while the inner and outer flux paths enclosing minor aperture 6 are designated 14 and 15 respectively. The sense of each path is either clockwise or counterclockwise depending upon the magnetic fields established by the various currents operating the core.

In operation, core C1 must first be cleared by a clear current pulse applied to clear input terminal 2. This places core C1 in a clear condition, ready to accept a set pulse, by causing all flux paths in the core to assume a clockwise sense. The set current pulse therefore is next applied to set input terminal 4. This places core C1 in the set condition by causing flux paths 12 and 15 to assume a counterclockwise sense. The condition of core C1 may now represent storage of a binary ONE in core C1, the ONE having been applied to set input terminal 4. The ONE may be stored in core C1 for an indefinite duration, or as long as no destructive read-out, such as that due to application of a clear pulse, is applied to core C1.

Figure 2:
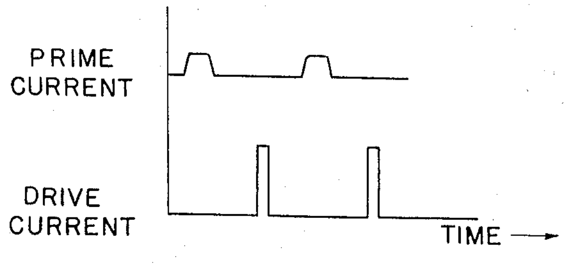
FIG. 2 is a graphical illustration of the pulse sequences applied to the output minor aperture of the driving core.

Referring now to FIG. 2, it can be seen that a drive current pulse is produced after each prime current pulse. Thus, in FIG. 1, after a pulse is coupled from prime generator P through minor aperture 5 of core C1, flux path 12 assumes a clockwise direction and flux path 13 assumes a counterclockwise direction, as can be determined from the well-known Right-Hand Rule. The prime pulse is of relatively long rise time and relatively low amplitude; therefore, the speed at which it reverses flux direction in the portion of the core around which output winding 7 is wound is not sufficiently rapid to induce an output pulse on winding 7 of any significant amplitude.

Following the prime pulse, a drive pulse is coupled through minor aperture 5 of core C1 from drive generator D. This pulse, as can be seen in FIG. 2, is of greater amplitude and shorter rise time than the prime pulse produced by prime generator P. The drive pulse, as can be determined from the Right-Hand Rule, reverses flux direction around minor aperture 5 so that flux path 12 now assumes a counterclockwise direction and flux path 13 now assumes a clockwise direction. Due to the sharpness of the drive pulse, flux around minor aperture 5 is rapidly switched, thereby inducing relatively large amplitude current on output winding 7. This pulse is coupled through minor aperture 9 of core C2 through winding 10, thereby setting core C2, and is also coupled through minor aperture 6 of core C1 on winding 8, thereby resetting core C1. Thus, the voltage pulse induced across winding 7 is divided so that a portion appears across winding 10 and the remaining portion appears across winding 8.

Thus, it is obvious that upon occurrence of each drive pulse coupled through minor aperture 5 of core C1, a pulse is produced which not only set the driven core C2, but also resets the driving core C1. Because the driving core is set simultaneously with occurrence of each drive pulse, the driving core does not change from its set condition until application of a clear pulse. Due to the resetting effect of the feedback winding, it is not necessary that the clear pulse occur within any given time; if the clear pulse should never recur, coil C1 will remain set indefinitely.

Thus, there has been described a magnetic system for indefinite storage of information. Non-desrtuctive read-out of the stored information may be continued indefinitely, without loss of the stored information, due to resetting of the system through a feedback circuit. Proper operation of the system is totally independent of the length of interval between successive clear pulses.

Although but one specific embodiment of the present invention has been described, it is to be specifically understood that this form is selected to facilitate in disclosure of the invention rather than to limit the number of forms which it may assume; various modifications and adaptations may be applied to the specific form shown to meet requirements of practice, without in any manner departing from the spirit or scope of the invention.

What is claimed is:

1. In a multi-aperture ferrite core having an input aperture and an output aperture, means coupled to the input aperture for setting the core, means coupled to the output aperture for priming the output aperture, an output winding wound through the output aperturue, a feedback winding wound through the input aperture and connected in series with the output winding, and driving means coupled through the output aperture for producing current in the output winding whereby said current resets the core by circulating through the feedback winding.

2. In a system for storing binary information and providing non-destructive means for sensing the stored information, the combination comprising a multi-aperture magnetic core, means coupled through a first minor aperture in the core for setting the core, an output winding wound through a second minor aperture in the core, means providing priming and readout pulses through the second minor aperture for inducing an output voltage on the output winding, and means coupling a portion of the output voltage to the first minor aperture for resetting the core.

3. A system for simultaneous storage and transfer of digital information comprising a plurality of multi-aperture ferrite cores, one of said cores having at least two minor apertures, means for coupling an initial set pulse through a first of said minor apertures, means for coupling alternate priming and driving pulses through the second minor aperture, an output winding coupled through the second minor aperture, a feedback winding coupled through the first minor aperture and connected to the output winding, and means coupling the output winding through a minor aperture in each of the remaining cores of said plurality whereby the second minor aperture of the first core receives a set pulse simultaneously with the minor apertures of said remaining cores.

4. A system for indefinite storage of information comprising a multi-aperture core having input means coupled to a first aperture for setting said core, and output means coupled to a second aperture, means producing output pulses across the output means, and means coupling a portion of each pulse from the output means back to the input means to provide a set pulse for the core upon occurrence of every output pulse.

5. Means for indefinitely producing an output indicative of the condition of a magnetic core comprising means coupling driving pulses through an output aperture of the core, an output winding wound through the output aperture, a feedback winding wound through an input aperture of the core, and means coupling the output winding to the feedback winding whereby a portion of the output is fed back to the input aperture, thereby setting the core upon occurrence of each driving pulse.

6. Means for indefinitely producing an output indicative of the condition of a magnetic core comprising means for initially setting the core through a first aperture of the core, means coupling priming current through a second aperture of the core, means coupling driving pulses through the second aperture, an output winding wound through the second aperture, a feedback winding wound through the first aperture, and means coupling the output winding to the feedback winding whereby a portion of the output is fed back to the first aperture, thereby resetting the core upon occurrence of each driving pulse.

7. Means for repeatedly setting a driven ferrite core from a driving ferrite core comprising means coupling driving signals through an output aperture in the driving core, an output winding wound through the output aperture of the driving core, an input winding wound through an input aperture of the driven core, and a feedback winding wound through an input aperture of the driving core, said input, output and feedback windings connected in series whereby each output pulse from the driving core produces a set pulse for the driven core and the driving core.

8. Means for repeatedly setting a driven ferrite core from a driving ferrite core comprising means coupling a set signal through an input aperture in the driving core, means coupling priming and driving signals through an output aperture in the driving core, an output winding wound through the output aperture of the driving core, an input winding wound through an input aperture of the driven core, and a feedback winding wound through the input aperture of the driving core, said input, output and feedback windings connected in series whereby each output pulse from the driving core produces a set pulse for the driven core and the driving core.

9. In a magnetic system for indefinite storage of information, a driving multi-aperture core, a driven multi-aperture core, means initially setting the driving core through a first minor aperture of the driving core, non-destructive read-out means comprising priming and driving pulses coupled through a second minor aperture in the driving core, an output winding coupled through the second minor aperture, a feedback winding coupled through the first minor aperture, and a set winding coupled through an aperture of the driven core, said output winding, feedback winding and set winding being connected in series whereby current produced by the output winding threads the aperture of the driven core and the first minor aperture of the driving core, thereby setting both the driving and driven cores.

References Cited by the Examiner

UNITED STATES PATENTS

| | | | |
|---|---|---|---|
| 3,046,532 | 7/1962 | Broadbent | 340—174 |
| 3,116,421 | 12/1963 | Newhall | 340—174 |
| 3,217,178 | 11/1965 | Burns | 340—174 |

BERNARD KONICK, *Primary Examiner.*

IRVING SRAGOW, *Examiner.*

J. MOFFITT, M. K. KIRK, *Assistant Examiners.*